Patented Jan. 27, 1931

1,790,095

UNITED STATES PATENT OFFICE

HARRY W. HOUGHTON, OF GLEN ECHO, MARYLAND, ASSIGNOR TO SAFETY FUMIGANT COMPANY, OF BOSTON, MASSACHUSETTS, A CORPORATION OF MASSACHUSETTS

FUMIGANT SOLUTION

No Drawing. Application filed July 1, 1925. Serial No. 40,949.

This invention relates to fumigants of the type comprising a lethal gas and a lachrymatory gas, or a gas which is both lethal and lachrymatory, and aims to provide a convenient and safe means for transporting and using the same. The invention consists in an improved liquid solvent and stabilizer to absorb the gas and to prevent the decomposition or polymerization thereof in the mixture during storage and transportation.

In utilizing a fumigant gas or gaseous combine, such, for example, as the cyanogen haloid (preferably chloride) and hydrocyanic acid gas described in my Patent No. 1,521,537, dated December 30, 1924, for fumigant and process of fumigation, difficulty has been experienced in generating the gas at the place of use, due to the dangerous nature of the materials and violent character of the reaction if not properly controlled; and it has been found impracticable to generate the gas at a distance and transport it to the place of use in containers, such as pressure cylinders, because of the propensity of the gas to polymerization and decomposition into cyan-uric chloride, which is not a fumigant.

As described in my application filed Octobed 22, 1924, Serial No. 745,251, for fumigant and method of fumigation, I have found that the gas may be absorbed in water but that it decomposes if stored for any considerable length of time, even after a lapse of only one day being unsuitable for fumigation purposes. I have further discovered that by the addition of a suitable stabilizer to the water, not only may larger volumes of the fumigant be absorbed but also the tendency of the gas to decompose is checked so that the solution may be kept for considerable periods of time without decomposition of the gas and retain its effectiveness as a fumigant.

For example, the addition of small percentages (twenty-five percent or less) of carbohydrates, such as glucose, or alcohol and alcohol derivatives, such as glycerine, to half a pint of water will enable enough gas to be absorbed to thoroughly fumigate one thousand cubic feet of space, and the solution may be kept in an ordinary glass bottle properly sealed until needed for use without appreciable deterioration.

My improvement consists in the addition of a small proportion of acetone to such a mixture of water and carbohydrate to increase its capacity for absorbing the gas and assist in maintaining its stability. For example, I have found that a mixture of twenty-five percent of glycerine and ten percent acetone with water enough to make a pint or so of liquid will absorb sufficient gas to fumigate one thousand cubic feet of space or more, depending on the density of lethal gas necessary for the particular purpose. Such a mixture has a lower boiling point than hydrocyanic acid and volatilizes readily without the application of artificial heat.

In using this mixture for household purposes it is only necessary to pour it into a shallow, open receptacle or spill it on the floor of the room to be fumigated, in an amount proportional to the size of the room and density of gas desired. The gas is emitted immediately, diffuses rapidly, and the liquid evaporates quickly, leaving no harmful residue.

The invention is especially adapted for many uses where it is desirable or convenient to use the solution as a spray, such for example as in fumigating trees, plants and crops, and in fumigating large spaces where it is necessary to use a considerable volume of the liquid and it is desirable to obtain a high concentration of gas in as short a time as possible.

Among the advantages of the invention are its high degree of safety both in storing, handling and in using the solution, the ease and rapidity with which the gas can be generated in the place of use, the greater effectiveness of the gases because of the presence of acetone, which is an insecticide, and the absence of poisonous residue. Furthermore, the ingredients of the solution are comparatively inexpensive and the entire cost of generating the gas and distributing it by this means is less than that of generating it in place as heretofore proposed.

Without restricting myself to the particular ingredients and proportions mentioned, what I claim and desire to protect by Letters Patent is as follows:

1. A fumigant solution comprising water, carbohydrate, acetone and a lethal and lachrymatory cyanogen derivative gaseous combine absorbed therein, substantially as described.

2. A fumigant solution comprising a mixture of water and acetone, and a lethal and lachrymatory cyanogen derivative gaseous combine absorbed therein.

3. A fumigant solution comprising a mixture of water, a soluble carbohydrate and acetone in lesser proportion, having dissolved therein a lethal and lachrymatory gas composed of hydrocyanic acid gas and a cyanogen haloid.

4. A fumigant solution comprising a mixture of water, glycerine, and acetone having dissolved therein hydrocyanic acid gas and a cyanogen haloid in proportions to combine to form a substantially permanent gas when liberated from solution.

5. A fumigant solution comprising water to which has been added a substantial proportion of glycerine and a lesser proportion of acetone, and in which cyanogen chloride and hydrocyanic acid gas have been dissolved.

6. A fumigant solution comprising acetone, a carbohydrate, hydrocyanic acid gas and cyanogen chloride in such proportions as to form a substantially permanent lethal and lachrymatory gas when liberated from solution.

In testimony whereof, I have signed my name to this specification.

HARRY W. HOUGHTON.